United States Patent Office 3,215,626
Patented Nov. 2, 1965

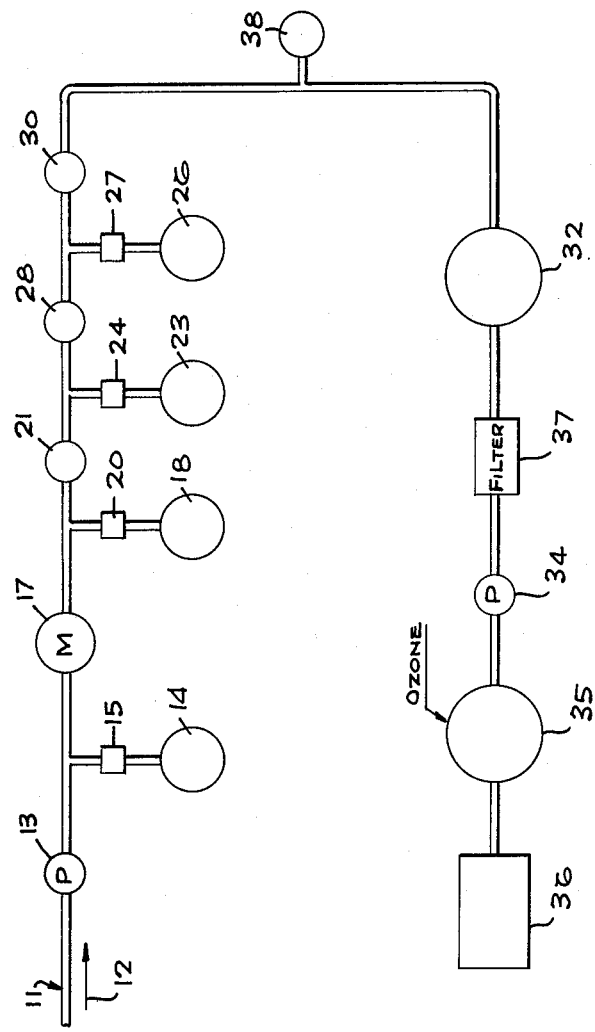
ORTHA M. CONSOLE
INVENTOR.
BY Mason & Graham
ATTORNEYS

3,215,626
PROCESS OF PRODUCING MINERALIZED DRINKING WATER
Ortha M. Console, Glendale, Calif., assignor to Sparkletts Drinking Water Corporation, Los Angeles, Calif., a corporation of California
Filed Jan. 8, 1963, Ser. No. 250,068
6 Claims. (Cl. 210—57)

This invention has to do with reconstituting water that is substantially mineral free to produce a palatable, healthful drinking water having a desired mineral content.

The chief purpose of the invention is to provide a clear, palatable drinking water which ideally meets the need of every member of a family—adults, infants, children, expectant mothers, and persons on low-sodium diets—and a principal object of the invention is to provide a novel process for producing such a water.

Another object is to provide a novel process for reconstituting mineral-free water to produce a clear mineralized drinking water containing substantial iron in solution but having only a negligible or extremely low amount of sodium. In this connection it has heretofore been found that water with an appreciable amount of iron in solution tends to cloud and become reddish-brown in color and it has only been by the use of sodium compounds that any substantial amount of iron could be retained in solution without causing the cloudy colored condition which renders the water unsuitable commercially for drinking.

Another difficulty has been that where water is sterilized by treating it with ozone, very little iron could be placed in solution and retained since the ozone caused precipitation of iron compounds. A further object is to provide a process for overcoming this.

A further object is to produce a mineralized water containing fluoride in an amount recommended by medical and public health authorities.

Another object is to provide a clear, palatable mineralized drinking water which in addition to containing iron also contains desirable amounts of iodine and trace amounts of copper and zinc.

A still further object is to provide a process for producing a clear, pleasant tasting water containing substantial iron and sterilizing the water by means of ozone alone, thereby eliminating the need for chlorine in the water.

These and other objects will be apparent from the drawing and the following description. The drawing is a diagramamtic representation or flow sheet showing one manner in which the invention can be carried out.

In carrying out the process it is essential to provide a distilled or demineralized water which contains no more than a trace of minerals. Such a water preferably should have no more than 1 p.p.m. of minerals and in particular not more than .1 p.p.m. of sodium. In a sense the first step in the overall process comprises the provision of such a mineral-free or nearly pure water either by distillation or by passing water from a given source through a deionizing system, as, for example, first through a two-bed deionizing system and then through a mixed bed system, such as is known in the art. Following this certain solutions of minerals are added to the mineral-free water.

Preferably the process is carried out on a continuous flow basis and I first add a solution of potassium tripolyphosphate ($K_5P_3O_{10}$) to the water and for convenience this may be done continuosly with a feeder pump. In the diagram, numeral 11 designates a pipe or conduit carrying the mineral-free water which flows in the direction of arrow 12 from a suitable source not shown. A pump 13 may be employed for moving the water. Numeral 14 designates a tank for the above mentioned solution and 15 a metering or feeder pump of any standard type.

The first solution added is a saturated solution with additional chemical in suspension and by way of example, I may prepare the solution in any suitable quantity by mixing the chemical and distilled water in the ratio of about one pound of chemical to one gallon of distilled water. In actual practice I have used 100 pounds of the chemical to 98 gallons of distilled water to produce some 104 gallons of solution and parts in suspension. Since more of the chemical is present than can go into solution, the solution or mixture must be kept agitated. In order to obtain a drinking water having a content of 3.3 p.p.m. of iron, I add or inject approximately 1.04 ml. of the solution to one gallon of water. This amounts to about 122 milligrams of the chemical to a gallon of the treated water. The water and added solution are mixed thoroughly by an agitator or mixing means 17 of any suitable type before the second solution, which contains the iron, is added.

The second solution, containing the iron, may be stored in a rubber-lined tank 18 and fed by a proportioning feeder 20 to the line 11. This is a solution of ferric chloride, and by way of example, I prefer to use about one pound of ferric chloride to one gallon of distilled water. In actual practice I have used 200 pounds of the chemical dissolved in 198 gallons of distilled water to make approximately 212 gallons of solution. This solution may also contain relatively small amounts of zinc sulphate and copper sulphate if desired. Between 600 and 650 grams of copper sulphate, and between 1150 and 1200 grams of zinc sulphate may be added. The resulting solution, either with or without the copper and zinc sulphates, or either of them, is added to the water in the line at a rate such that it amounts to .533 ml. to the gallon of water. This amounts to about 60 milligrams of the chemical to a gallon of the treated water. Mixing continues by suitable means 21.

After the introduction of the iron I add a third solution, namely one of dibasic ammonium phosphate which may be in a ratio of one pound of chemical to one gallon of distilled water. This raises the pH of the water and also serves to add additional phosphate. I have prepared the solution by dissolving 200 pounds of the chemical in 200 gallons of distilled water to produce some 208 gallons of solution. The resulting solution is added to the water as from a tank 23 by a feeder 24 in the proportion of 1.04 ml. to the gallon of water. This amounts to about 120 milligrams of the chemical to one gallon of the treated water.

Preferably I also include sodium fluoride and potassium iodide in the water and this may be accomplished by dissolving ten pounds of sodium fluoride and 157 grams of potassium iodide in some 284 gallons of distilled water. This is added to the water from tank 26 by feeder 27 downstream in the proportion of 1.6 ml. to the gallon.

I have found that by adding potassium tripolyphosphate to the water this enables me later to introduce and retain a substantial amount of iron in solution in the water without clouding and thus produce a sparkling, clear, pleasant-tasting water, even after it has been treated with ozone and this solution appears to be necessary in order to hold the iron in solution where the water is ultimately to be sterilized with ozone.

The ratio of potassium tripolyphosphate to ferric chloride should be of the order of between about 1.8–2.1 of the former to 1 of the latter. Tetrapotassium pyrophosphate may be used in place of potassium tripolyphosphate although it would alter the phosphorus balance.

The final step in the process consists in treating the water by introducing ozone into it to effect complete sterilization.

After the addition of potassium iodide and sodium fluoride the water passes through a mixer 30 and then passes to a storage tank 32. From the latter, the water is moved by pump 34 to the tank 35 where ozone is introduced and finally bottled by a filler 36. A filter may be provided in the line at 37. Also, a Micromax control unit 38 may be employed to accurately record the mineral content and stop the process should there be malfunction of the feeders.

Although I have shown and described preferred forms of my invention, I contemplate that various changes and modifications can be made therein without departing from the invention, the scope of which is indicated by the following claims.

I claim:

1. The method of producing a clear, palatable, mineralized drinking water having a high iron content and an extremely low-sodium content utilizing water having a maximum mineral content of the order of 1 p.p.m. and a sodium content not in excess of 0.1 p.p.m., which comprises adding potassium tripolyphosphate to the water and mixing, adding ferric chloride solution to the resulting solution and mixing, and adding dibasic ammonium phosphate to the resulting solution and mixing.

2. The method set forth in claim 1 which includes the further step of injecting ozone into the water to sterilize the same.

3. The method of producing a clear, palatable, mineralized drinking water having a relatively high specified iron content and an extremely low sodium content utilizing water which is substantially free of minerals, which comprises adding potassium tripolyphosphate to the water and mixing, adding sufficient ferric chloride solution to the resulting solution to obtain the desired iron content and mixing, adding dibasic ammonium phosphate to the resulting solution and mixing, and sterilizing the resulting solution by introducing ozone thereinto.

4. The method set forth in claim 3 in which the proportion of potassium tripolyphosphate to ferric chloride by weight is of the order of between 1.8 to 1 and 2.1 to 1.

5. The method of producing a clear, palatable, mineralized drinking water having a high iron content and an extremely low-sodium content utilizing water having a maximum mineral content of the order of 1 p.p.m. and a sodium content not in excess of 0.1 p.p.m., which comprises adding a chemical from the class consisting of tetrapotassium pyrophosphate and potassium tripolyphosphate to the water and mixing, adding ferric chloride solution to the resulting solution and mixing, and adding dibasic ammonium phosphate to the resulting solution and mixing.

6. The method set forth in claim 5 in which the ratio of the chemical selected from said class to ferric chloride is of the order of from 1.8–2.1 of the chemical to 1 of ferric chloride.

References Cited by the Examiner

"Iron and Manganese in Water Supplies," Riddick et al., Jour. AWWA, May 1958, vol. 50, pages 688–696.

"Significance of Chemical Limits in USPHS Drinking Water Standards," Welsh et al., Jour. AWWA, March 1960, vol. 52, pages 289–300.

MORRIS O. WOLK, *Primary Examiner.*